United States Patent [19]

Grego

[11] Patent Number: 4,669,829

[45] Date of Patent: Jun. 2, 1987

[54] DEVICE FOR CONTROLLING THE LIGHT PASSING TO A LIGHT-SENSITIVE ELEMENT

[75] Inventor: Giorgio Grego, Venaria, Italy

[73] Assignee: Cselt - Centro Studi e Laboratori Telecomunicazioni S.p.A., Turin, Italy

[21] Appl. No.: 669,602

[22] Filed: Nov. 8, 1984

[30] Foreign Application Priority Data

Nov. 10, 1983 [IT] Italy .............................. 68172 A/83

[51] Int. Cl.[4] .......................... G02F 1/01; G02B 26/02
[52] U.S. Cl. ..................................... 350/355; 350/267
[58] Field of Search ............... 350/353, 355, 356, 267, 350/363

[56] References Cited

U.S. PATENT DOCUMENTS 3,910,687 10/1975 Iwata .
4,298,448 11/1981 Müller et al. ....................... 350/355

FOREIGN PATENT DOCUMENTS 2345337 4/1974 Fed. Rep. of Germany .

OTHER PUBLICATIONS

Thompson "Liquid Magnetic Bubble Display", *IBM Tech. Disclosure Bulletin*, vol. 17, No. 6, pp. 1842–1843, Nov. 1974.
Runyan, "Electrostatic Liquid Display Devices", *IBM Tech. Disc. Bull.*, vol. 22, No. 1, p. 325, Jun. 1979.
Garwin et al., "Ferrofluid Bubble Display", IBM Tech. Disc. Bulletin, vol. 18, No. 8, pp. 2675–2676, Jan. 1976.

*Primary Examiner*—John K. Corbin
*Assistant Examiner*—D. Edmondson
*Attorney, Agent, or Firm*—Karl F. Ross; Herbert Dubno

[57] ABSTRACT

The device consists of a transparent container, partly filled with a ferromagnetic fluid surrounding a bubble of a transparent liquid. By an external magnetic field the ferromagnetic fluid is displaced within the container and moves the bubble making it pass between a light source and a light sensitive element.

2 Claims, 2 Drawing Figures

U.S. Patent    Jun. 2, 1987    4,669,829
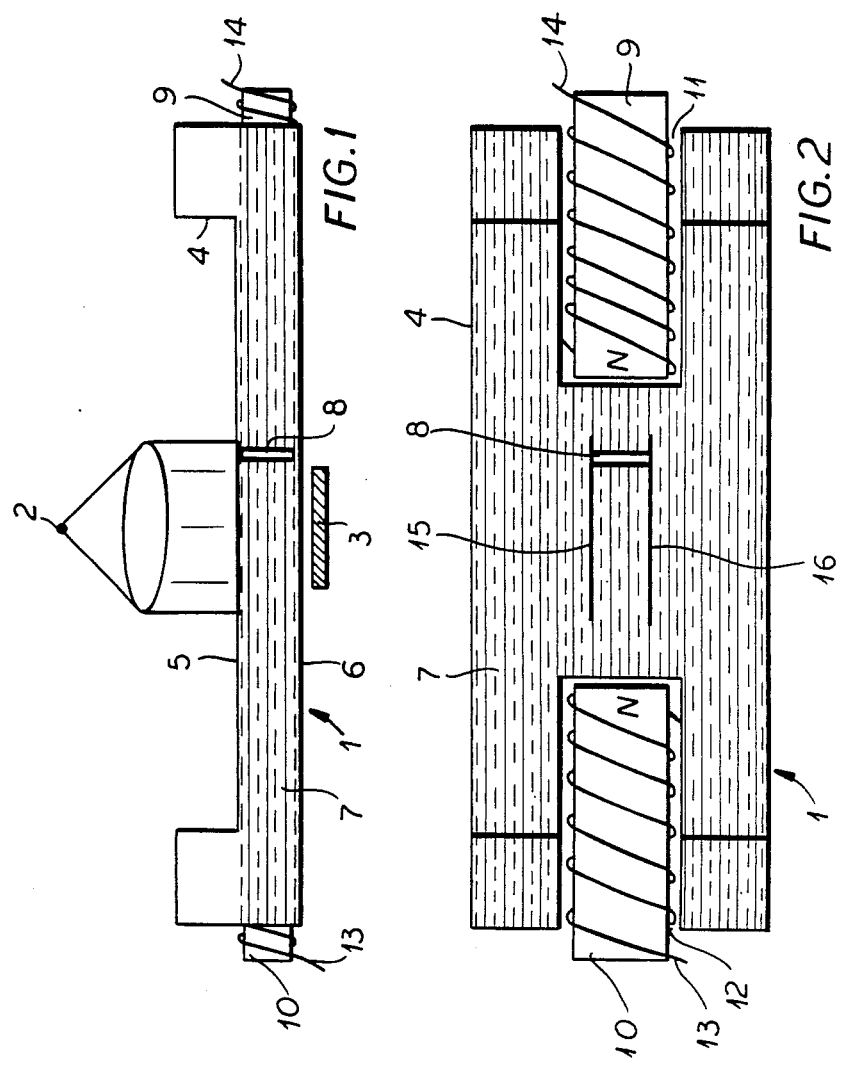

DEVICE FOR CONTROLLING THE LIGHT PASSING TO A LIGHT-SENSITIVE ELEMENT

FIELD OF THE INVENTION

The present invention relates to a device employing a ferromagnetic fluid for controlling the light passing to a light-sensitive element.

BACKGROUND OF THE INVENTION

Control devices of that kind are well known in the art for example, in U.S. Pat. No. 3,910,687 patent application No. 2,345,337. In these devices, a transparent container with two main surfaces facing a light source and a light-sensitive element, respectively, contains the ferromagnetic fluid and a transparent liquid immiscible with the ferromagnetic fluid, arranged so that under rest conditions the opaque ferromagnetic fluid may intercept the light rays sent towards the light-sensitive element; to let the light pass, a magnetic field is generated by electromagnets and causes the displacement of the ferromagnetic fluid which is replaced, in the region which is to be traversed by light rays, by the transparent liquid.

The disadvantage of these control devices is that they cannot assure the uniform illumination of light-sensitive material. These devices have the characteristics of the exposure time progressively decreasing from the ares in which the ferromagnetic-fluid shift begins to that in which it ends.

OBJECT OF THE INVENTION

It is the object of the present invention to provide a device which overcomes the above-mentioned deficiency.

This object can be attained in that the transparent liquid substantially forms a bubble, in contact with two main surfaces, surrounded by the ferromagnetic fluid and having a constant width in the plane of these surfaces, the magnetic-field generating means move said bubble at a constant speed.

BRIEF DESCRIPTION OF THE DRAWING

Reference is now made to the accompanying drawing, in which FIGS. 1 and 2 are plan and cross-sectional views, respectively, of the device according to the invention.

SPECIFIC DESCRIPTION

As shown, the light control device provided by the invention, denoted as a whole by 1, is placed between a light source 2 and a light-sensitive element 3 (for instance a photographic film, a photodiode matrix, etc.).

The device consists of a hermetically-sealed container 4, with two parallel main faces 5, 6 (main surfaces) facing light source 2 and light-sensitive element 3, respectively, and side surface of suitable cross-section (e.g. reactangular as in the Figures, or circular).

The two main faces are transparent or have at least one central transparent area in correspondence with the light-sensitive element. Container 4 is partly filled with an opaque ferromagnetic fluid 7 surrounding a bubble 8 of a transparent liquid, immiscible with the ferromagnetic fluid. The bubble acts as the aperture of a conventional focal-plane shutter of a photographic camera.

Suitable materials for the ferromagnetic fluid and the transparent liquid are reported in the documents cited (see the Abstract of U.S. Pat. No. 3,910,687 for example). Bubble 8 is in contact with main faces 5, 6 of container 1 and, in order to carry out the above functions, must have in plan a basically reactangular shape, as shown in FIG. 2.

The position of bubble 8 inside container 4, when the device is in rest conditions, depends on the relative positions of container 4, source 2 and light-sensitive element 3, and in particular it will be such that opaque ferromagnetic fluid 7 intercepts light rays coming from source 1. Therefore, if the container, the source and the light-sensitive element are in register on a common axis, as shown in FIG. 1, bubble 8 under rest conditions must be off-set with respect to the container axis. This is obtained by two permanent magnets 9 and 10, with facing poles of the same polarity and housed in two opposite cavities 11, 12 of the side surface of container 4.

To obtain the rest position of bubble 8 shown in the drawing the two magnets generate magnetic fields of different intensity. Furthermore, to assure a uniform plan width of bubble 8, the longitudinal dimension thereof is small as compared to the corresponding magnet dimension.

A plurality of pairs of small-sized magnets could also be used as an alternative to a single pair of magnets 9, 10 of large size as compared to the bubble.

A solenoid 13 is wound around magnet 10 and is associated with a circuit (not shown) controlling the passage within solenoid 13 itself, for a predetermined time, of a current having such intensity and direction as to cause the shift of the ferromagnetic fluid, and of bubble 8, towards magnet 10 against the action of magnet 9.

When activating solenoid 13, if the magnetic field generated by the solenoid acts in the same direction as that generated by magnet 10, the ferromagnetic fluid is attracted towards magnet 10 and drags bubble 8 at constant speed, thus assuring a uniform exposure of the whole light-sensitive element.

By deactivating solenoid 13, the ferromagnetic fluid and the bubble recover the rest position under the action of the permanent magntic fields generated by magnets 9, 10. Total exposure time is the sum of the times taken by the two displacements. The displacement of ferromagnetic fluid 7 is made possible for instance by making the edge portions of container 4 higher than the central portion and operating so that under rest conditions of the device these edge portions are not completely filled by the fluid.

The ratio between the volume of the empty portion and the volume occupied by the ferromagnetic fluid determines the amplitude of the bubble displacement. During such displacement the bubble can be guided by a pair of partitions 15, 16 facilitating the maintenance of the regular shape of the bubble itself.

The above description has been given only by way of example and not in a limiting sense; variations and modifications could be made while remaining within the scope of the invention. In particular device flexibility can be increased by the use of a second solenoid 14 wound around magnet 9, so as to generate a more intense field and allow shorter exposure times, or to eliminate the automatic bubble return (and hence to have two rest positions of same at both ends of partitions 15, 16).

I claim:

1. A device for controlling light passing from a light source to a light-sensitive element comprising:
   a hermetically sealed container having two mutually parallel main surfaces, comprising transparent areas, one of said surfaces facing said light source and the other of said surfaces facing said light-sensitive element;
   an opaque ferromagnetic fluid and a transparent liquid in said hermetically sealed container, said ferromagnetic fluid and said transparent liquid being immiscible with each other and said transparent liquid substantially forming a bubble contacting said two surfaces and having a constant width;
   a pair of permanent magnets arranged with confronting like poles for determining an at rest position for said bubble; and
   at least one electromagnet, a core of said electromagnet consisting of one of said permanent magnets for controlling translation of said bubble at a constant speed between said surfaces and wherein said container comprises higher edge portions being partly empty from said ferromagnetic fluid at said at rest position and further comprises two parallel portions in a central region, performing as guides for said bubble, said two parallel portions being perpendicular to said two main surfaces.

2. A device as defined in claim 1 wherein said container comprises cavities of housing said permanent magnets.

* * * * *